United States Patent [19]

Haugen

[11] 4,111,157

[45] Sep. 5, 1978

[54] ANIMAL LITTER CONTAINER

[76] Inventor: Donald Haugen, 709 W. Huron St., Ann Arbor, Mich. 48103

[21] Appl. No.: 761,990

[22] Filed: Jan. 24, 1977

[51] Int. Cl.² .................. A01K 29/00; A47K 11/02
[52] U.S. Cl. .................................. 119/1; 119/19; 220/281
[58] Field of Search .................. 119/1, 17, 19, 23; D30/1, 41, 99; 220/281; 150/0.5

[56] References Cited

U.S. PATENT DOCUMENTS

| 2,914,022 | 11/1959 | Hinton | 119/17 |
| 3,310,031 | 3/1967 | Lowe, Jr. | 119/1 |
| 3,771,493 | 11/1973 | Chandor | 119/1 |

Primary Examiner—Hugh R. Chamblee
Attorney, Agent, or Firm—Bacon & Thomas

[57] ABSTRACT

An enclosed litter container for animals, the container having upper and lower enclosure portions which are joined together to form an enclosed space. The upper enclosure portion includes an opening to provide access for an animal to the enclosed space. The upper portion also includes a depending flange which fits within a widened rim of the lower portion of the litter container to restrainingly couple the two portions together and to seal the joint between the portions to prevent escape of urine therefrom. The upper enclosure portion includes an outwardly bowed compressible resilient section which, when compressed, causes the depending flange to move out of restraining engagement with the widened rim of the lower portion to facilitate separation of the enclosure portions. The depending flange and the widened rim portion are configured so as to direct urine away from the region of the joint between the two enclosure portions and toward the bottom of the lower enclosure portion which contains the litter.

15 Claims, 5 Drawing Figures

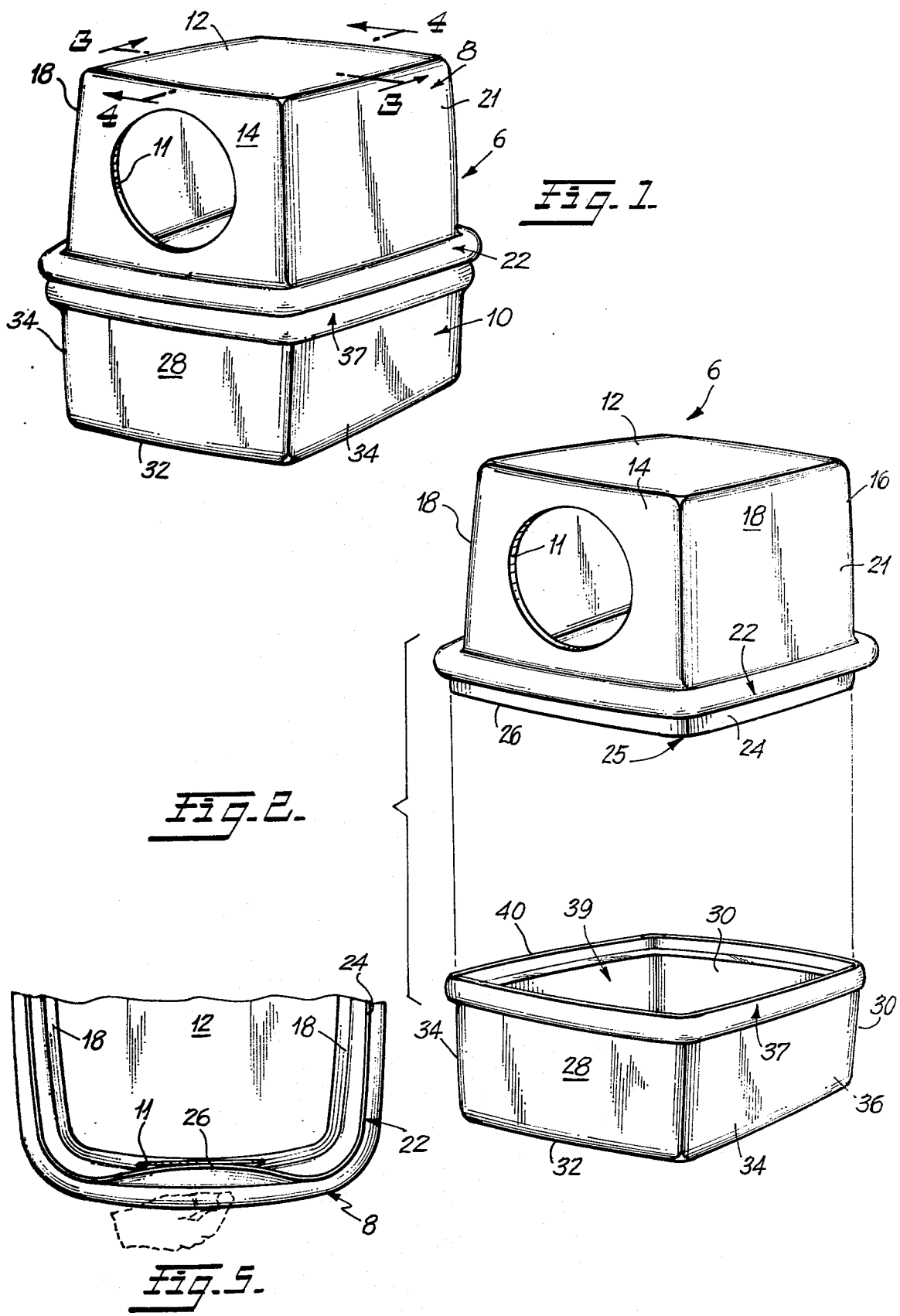

ANIMAL LITTER CONTAINER

BACKGROUND AND OBJECTS

1. Field of the Invention

The present invention relates to an enclosed sanitary facility for animals, and more particularly to an enclosed indoor commode for use by cats.

2. Description of the Prior Art

It is well known to provide indoor toilet facilities for household pets, particularly cats. Such facilities are normally used to contain a loose, absorbent material, such as granulated clay, for receiving animal excretions. The material is commonly referred to as litter.

It has previously been known to provide litter containers which are substantially completely enclosed except, of course, for an opening providing access for the animal to the enclosed space. Examples of enclosed litter containers are disclosed in U.S. Pat. No. 3,246,630 to Dearing et al and the present inventor's U.S. Design Patent Application No. 394,258, filed Sept. 4, 1973, and now abandoned. These two prior art devices include upper and lower enclosure portions which are removably joined together. The lower portion contains the litter, and the upper portion may be separated therefrom to allow for cleaning of the container and changing of the litter.

A drawback of known devices having separable upper and lower enclosure portions is that certain pets have a tendency to spray urine against the inside walls of the container, and the urine may collect in the joint between the upper and lower enclosure portions and leak therefrom. In the known types of enclosed litter boxes with separable enclosure portions, the leakage problem conflicts with the need for providing easy separability between the enclosure portions. That is, the fit between enclosure portions in the known devices must be relatively loose in order to allow for reasonably easy separation of the portions for cleaning, but the looser the fit, the greater the leakage.

3. Objects of the Invention

It is therefore an object of the present invention to overcome the foregoing drawbacks of prior art devices and to provide an enclosed litter container having upper and lower portions which, on the one hand, may be easily separated, but which, when joined together, prevent the escape of urine from the joint between the portions.

It is a further object of the invention to provide an animal litter container with upper and lower portions which may be tightly joined together but also easily separable.

It is a further object of the invention to provide an animal litter container with the foregoing features of tight coupling and easy separability in a device which is simple, easily manufactured, relatively inexpensive and which requires no assembly other than joinder of the two enclosure portions.

It is a further object of the invention to provide an animal litter container wherein the upper and lower portions, when joined, are sealed with respect to each other to prevent the escape of liquid from the joint between the section.

It is a further object of the invention to provide an animal litter container with upper and lower separable enclosure portions in which urine is directed away from the joint between the portions and toward the bottom of the lower portion which contains the litter.

These, and other objects, advantages, and features of the present invention will be apparent from the present specification and drawings.

SUMMARY

To overcome the drawbacks of the prior art and to achieve the objects of the invention, the litter container of the present invention includes first and second enclosure portions which define an enclosed space when joined together, means in one of the enclosure portions to provide access for an animal to the enclosed space, means on the first enclosure portion for coupling the first and second closure portions together, at least part of the coupling means of the first enclosure portion restrainingly engaging the second enclosure portion, and means on the first enclosure portion for effecting movement of the coupling means out of restraining engagement with the second enclosure portion of the container so that the container portions may be easily separated.

The moving means includes a compressible resilient section having an outwardly convex bowed configuration, this convex, bowed section extending about the entire periphery of the first enclosure portion to form a first peripheral bead. The means on the first enclosure portion for coupling the enclosure portions together is a downwardly depending flange extending entirely around the first enclosure portion. This flange fits within a widened rim of the second enclosure portion, the widened rim also extending entirely about the device to form a second peripheral bead. The first and second enclosure portions sealingly engage each other to prevent escape of liquid from between the portions. To separate the enclosure portions for cleaning of the container and/or changing of the litter, the compressible resilient section is squeezed or compressed to bring part of the downwardly extending flange on the first enclosure portion out of engagement with the widened rim of the second enclosure portion thus permitting easy separation.

The second enclosure portion includes a cavity for containing litter, which cavity is part of the enclosed space. The widened rim of the second enclosure portion includes means for directing liquid, specifically, urine, from the region of the widened rim toward the litter-containing cavity in the second enclosure portion. This directing means includes a curved corner between the widened rim and the main body portion of the second enclosure. Another means for directing liquid toward the litter-containing cavity of the second portion is embodied by an inwardly curved lip at the free edge of the first container portion. Both directing means cooperate with each other to direct liquid, specifically, urine, toward the litter-containing cavity of the second enclosure portion. Both enclosure portions are of a one-piece, molded plastic construction, and thus the entire litter container consists of only two pieces.

BRIEF DESCRIPTION OF THE DRAWING

FIG. 1 is a perspective view of the animal litter container of the present invention;

FIG. 2 is an exploded perspective of the animal litter container of FIG. 1 showing the top separated from the bottom;

FIG. 5 is a fragmentary elevational view from below, of the open side of the upper enclosure portion when the compressible resilient section thereof is compressed to effect separation of the enclosure portions.

DETAILED DESCRIPTION OF THE PREFERRED EMBODIMENT

Figure 3:
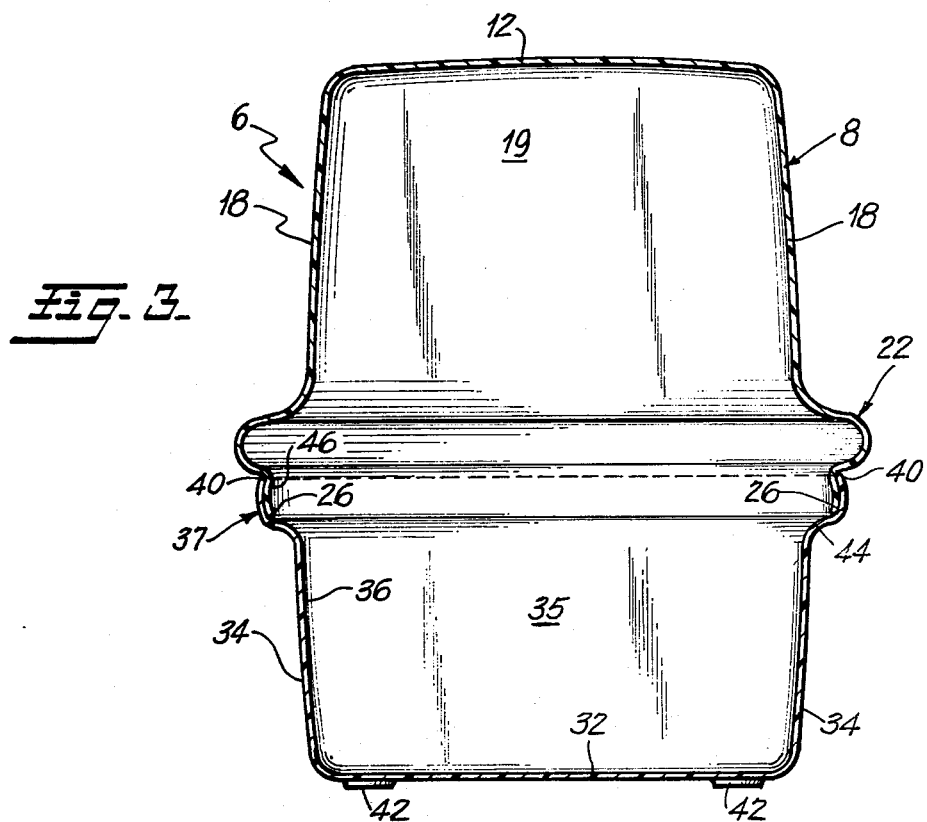
FIG. 3 is an enlarged transverse vertical sectional view, through the animal litter container, taken on the line 3—3 of FIG. 1.

In the following description and in the drawing, like reference characters refer to like features or elements among the various figures of the drawing.

Figure 4:
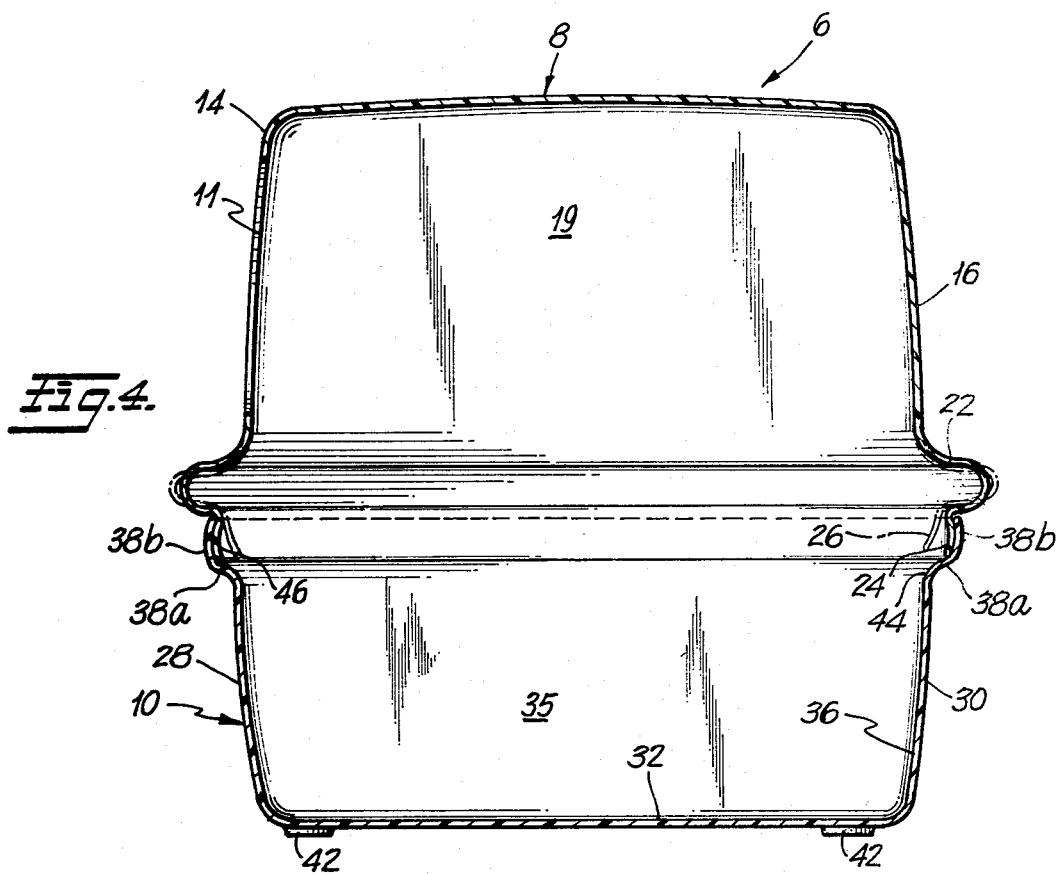
FIG. 4 is a longitudinal vertical sectional view, taken on the line 4—4 of FIG. 1.

Referring to the drawing, the overall animal litter container is generaly referred to by reference character 6. The container includes an upper enclosure portion 8 and a lower enclosure portion 10. Enclosure portions 8, 10 can be joined together as shown in FIGS. 1, 3 and 4 to define a space which is completely enclosed except for an opening 11, which opening provides an access for an animal to the enclosed space as will be apparent from the drawing, enclosure portions 8, 10 are joined together in a substantially horizontal joining plane.

Upper enclosure portion 8 includes a top wall 12, a front wall 14, a rear wall 16 and a pair of oppositely disposed side walls 18 which, together, define a cavity 19 (See FIGS. 3 and 4), walls 14, 16 and 18 being generally upright as shown. Opening 11 is in the front wall 14 of upper enclosure portion 8. Cavity 19 of upper enclosure portion 8, of course, forms part of the enclosed space defined by the overall container 6. Walls 12, 14, 16 and 18 form the main body portion 21 (FIG. 2) of upper enclosure portion 8.

Extending outwardly from main body portion 21 is an outwardly bowed compressible resilient section 22 of the upper enclosure portion. Compressible resilient section 22 has, in cross section, the configuration of a loop as shown in FIGS. 3 and 4, and this section extends entirely around enclosure portion 8 at the lower side 25 thereof, i.e. at the side at which enclosure portion 8 is joined with enclosure portion 10. Thus, compressible resilient section 22 forms a peripheral bead around the lower side of enclosure portion 8. The lower side of enclosure portion 8 also includes a flange 24 contiguous with and depending from the compressible resilient section 22 of enclosure portion 8. Depending flange 24 also extends about the entire periphery of enclosure portion 8.

When the upper and lower enclosure portions 8, 10 are separated, the lower side 25 of enclosure portion 8 is open. This open side is defined by the lowermost free edge 26 of enclosure portion 8, and free edge 26 also coincides with the outer extremity of depending flange 24. The walls forming the main body portion 21 of upper enclosure portion 8, the compressible resilient section 22 thereof and the depending flange 24 thereof are all of a one piece construction, and are preferably formed of a molded, resilient plastic material.

Lower enclosure portion 10 includes a front wall 28, a rear wall 30, a bottom wall 32 and a pair of oppositely disposed side walls 34, walls 28, 30 and 34 being generally upright as shown. Together, these walls form a cavity 35 (FIGS. 3 and 4). Cavity 35, of course, forms part of the enclosed space defined by the overall container 6. The litter or other absorbent and/or loose material for receiving animal excretions will be contained in cavity 35.

Walls 28, 30, 32 and 34 form the main body portion of enclosure portion 10. Extending outwardly from main body portion 36 is a widened rim portion 37 (FIGS. 1, 2 and 3). Widened rim portion 37 includes an outwardly extending shoulder 38a and an upstanding flange 38b. The widened rim portion 37 extends about the entire periphery of enclosure portion 10 at the upper side 39 thereof, i.e. the side which is joined with enclosure portion 8. When the enclosure portions are separated, the upper side 39 of enclosure portion 10 is open (FIG. 2). Open, upper side 39 is defined by the uppermost free edge 40 of enclosure portion 10. Free edge 40 also coincides with the outermost extremity of upstanding flange 38b. Lower enclosure portion 10 includes downwardly extending feet 42 for engagement with a floor or other surface on which container 6 will rest. The walls forming the main body portion 36 of enclosure portion 10, the widened rim portion 37 thereof, and the feet 42 thereof are all of one piece construction, and are preferably constructed of a molded resilient plastic material.

The depending flange 24 is of such size and positioning on upper enclosure portion 8 as to tightly and restrainingly engage the upstanding flange 38b of lower enclosure portion 10 when the enclosure portions are coupled together as shown in FIGS. 1 and 3. The compressible resilient section 22 acts as a spring to urge flange 24 against flange 38b when the enclosure portions 8, 10 are in the condition as shown in FIGS. 1 and 3. Also, in the condition shown in FIGS. 1 and 3, flanges 24 and 38b mate with each other in overlapping, face-to-face sealing engagement. The resilient plastic material of which flanges 24 and 38b are constructed, the aforesaid overlapping face-to-face engagement of flanges 24 and 38b, and the aforesaid urging of flange 24 against flange 38b all contribute to a tight seal between the upper and lower enclosure portions 8, 10 to prevent the escape of urine from the joint between the containers.

While contributing to the tight restraining and sealing engagement between the upper and lower enclosure portions 8, 10, the outwardly bowed, compressible resilient section 22 also contributes to ease in separability of the sections. When it is desired to remove the upper enclosure portion 8 from the lower enclosure portion 10 to change the litter in the lower enclosure portion and/or to clean the container, part of the compressible resilient section 22 is simply manually squeezed as indicated by phantom line in FIGS. 4 and 5. As will be apparent from FIGS. 4 and 5, compressible resilient section 22 is manually gripped in opposed, vertically spaced gripping areas disposed in substantially horizontal gripping planes. As shown in FIG. 4, the opposed gripping areas are relatively movable toward each other by a manual squeezing action from a relaxed position shown in solid lines wherein the two gripping areas are vertically spaced from each other a given distance to a compressed position shown in phantom lines wherein the two gripping areas are closer together and spaced from each other another distance which is less than the given distance. This manual squeezing results in a part of depending flange 24 bowing inwardly away from upstanding flange 38b as shown in phantom lines in FIG. 4 and as shown in FIG. 5. This causes part of flange 24 to move away from upstanding flange 38b. Although there will still be some engagement between flanges 24 and 38b in the region where section 22 is compressed, flange 24 no longer restrainingly engages flange 38b. Thus, when compressible resilient section 22 is compressed as shown in FIGS. 4 and 5, the upper enclosure portion 8 may be removed from the lower enclosure portion 10.

Compressible resilient section 22 need only be grasped and manually compressed on one side of the container to free the upper enclosure portion 8 from the lower enclosure portion 10. Normally, the front side of the container corresponding with walls 14 and 28 and including the opening 11 is the most accessible side, and compressible section 22 will preferably be squeezed and compressed on that side just below opening 11. The front side (corresponding to wall 14) of the upper enclosure portion 8 can then be lifted upwardy with respect to lower enclosure portion 10 in a more or less pivoting action. That is, a certain degree of pivoting will take place between portions of flanges 24 and 38b at the back side of the container i.e. the side corresponding to walls 16 and 30. Only a very slight upward pivoting movement to an extent less than the vertical height of flanges 28, 38b will be enough to loosen the engagement between the flanges around the entire periphery of the litter container 6, thus enabling the upper enclosure portion 8 to simply be lifted away from the lower enclosure portion 10.

The compressible resilient section 22 may also be grasped and manually compressed at the opposite front and back sides of the container, as shown in FIG. 4, the upper enclosure portion 8 then being lifted directly upwardly to separate it from the lower enclosure portion 10. The compressible resilient section may also be grasped at opposite lateral sides (i.e. at the opposite sides corresponding to walls 18 and 34) and lifted directly upwardly. Regardless of the side or pairs of sides on which the compressible resilient section 22 is manually compressed, it is preferred that such compression take place near the center of such side as shown in FIG. 5. The central region of each side of section 22 is the most resilient, and compression of section 22 near the center of each side provides the maximum inward bowing as shown in FIG. 5.

To further prevent escape of urine from the joint between the upper and lower enclosure portions 8, 10, the region of the litter container 6 near the joint is shaped so as to direct liquid away from the joint and toward the cavity 35 which receives the litter or other loose and/or absorbent material. Specifically, the lower enclosure portion 10 has a curved corner 44 between the main body portion 21 thereof and the widened rim portion 37 thereof. More specifically, curved corner 44 is between main body portion 21 and the outwardly extending shoulder 38 which partially forms the widened rim portion 37.

To further direct urine away from the joint between enclosure portions 8, 10, and to contribute to a tight fit between the portions, the flanges 24 and 38b of the respective portions have a slight outwardly convex curvature. When enclosure portions 8, 10 are assembled, this curvature will cause any urine sprayed against the inner flange, i.e. flange 24, to be directed downwardly and inwardly. In other words, flange 24, and specifically the free edge 26 thereof, acts as a curved lip directing urine downwardly and inwardly as well as directing it toward the curved corner 44. Together, curved corner 44 and the curved lip 46 of flange 24 cooperate to direct urine toward the cavity 35 in lower enclosure portion 10.

It will be understood that, as used herein, terms such as "upper," "lower," "above," "below," "front," and "rear," are used only to describe relative positions and relationships, and are by no means absolute or limiting. It will further be understood that the foregoing specification describes only a preferred embodiment which exemplifies the invention and that many modifications, variations and other embodiments are possible. The invention, of course, is limited only by the scope of the appended claims.

What is claimed is:

1. An animal litter container comprising:
 a. a first enclosure portion;
 b. a second enclosure portion, one of said enclosure portions being disposed vertically above the other, said enclosure portions each being defined by a wall, such wall including generally upright wall portions and other wall portions joining said generally upright wall portions;
 c. means in one of said side walls of one of said enclosure portions to provide access for an animal to said enclosed space, said first and second enclosure portions otherwise defining a completely enclosed space when joined together;
 d. means on said first enclosure portion for coupling said first and second enclosure portions together in a substantially horizontal joining plane, at least part of said coupling means restrainingly engaging said second enclosure portion;
 e. means on said first enclosure portion for effecting movement of said coupling means out of restraining engagement with said second enclosure portion of said container, said moving means including a compressible resilient section of said wall of said first enclosure portion, said compressible resilient section having an outwardly convex bowed configuration, said compressible resilient section including first means for gripping said section in a first, substantially horizontal gripping plane and second means for gripping said section in a second, substantially horizontal gripping plane, said gripping means being relatively movable by a manual squeezing action from a relaxed position wherein said first and second gripping means are vertically spaced from each other a given distance to a compressed position wherein said first and second gripping means are closer together and spaced from each other another distance which is less than said given distance, the movement of said first and second gripping means from said relaxed to said compressed positions effecting said movement of said coupling means out of restraining engagement, whereby said enclosure portions may be separated.

2. An animal litter container as defined in claim 1 wherein said outwardly bowed portion of said first enclosure portion extends about the entire periphery of said container to form a first peripheral bead.

3. An animal litter container as defined in claim 2 wherein said second portion of said enclosure includes a widened rim portion for engagement with said coupling means of said first enclosure portion, said widened rim portion extending about the entire periphery of said second enclosure portion to form a second peripheral bead.

4. An animal litter container as defined in claim 2 wherein said coupling means is a downwardly depending flange on said first enclosure portion, said downwardly depending flange being contiguous with said outwardly bowed portion, said downwardly depending flange extending about the entire periphery of said first enclosure portion.

5. An animal litter container as defined in claim 1 wherein said coupling means on said first enclosure portion is disposed inside said second enclosure portion when said first and second enclosure portions are coupled together.

6. An animal litter container as defined in claim 1 wherein said coupling means of said first enclosure portion sealingly engages said second enclosure portion to prevent escape of liquid from between said first and second enclosure portions.

7. An animal litter container as defined in claim 1 wherein:
   a. said first enclosure portion is said one enclosure portion disposed above said second enclosure portion;
   b. said access means includes an opening in said first enclosure portion; and
   c. said second enclosure portion includes a cavity for containing litter, said cavity being part of said enclosed space.

8. An animal litter container as defined in claim 7 wherein said second enclosure portion includes a main body portion and a widened rim portion, said widened rim portion being engageable with said coupling means of said first enclosure portion.

9. An animal litter container as defined in claim 8 wherein said widened rim portion includes an outwardly extending shoulder and an upstanding flange.

10. An animal litter container as defined in claim 8 wherein said widened rim portion includes means for directing liquid from the region of said widened rim portion toward said cavity.

11. An animal litter container as defined in claim 10 wherein said directing means includes a curved corner between said widened rim portion and said main body portion of said second enclosure portion.

12. An animal litter container as defined in claim 8 wherein each enclosure portion has one side open to the interior of said enclosed space, each open side being defined by a free edge extending entirely around each enclosure portion.

13. An animal litter container as defined in claim 12 wherein said widened rim portion includes one means for directing liquid from the region of said widened rim portion toward said cavity, said one directing means being a curved corner between said widened rim portion and said main body portion and wherein said first enclosure portion includes another means for directing liquid toward said cavity, said other directing means including a concave inwardly curved lip at said free edge of said first enclosure portion, said first and second directing means cooperating to both direct liquid away from the region where said first and second enclosure portions join each other and toward said cavity of said second enclosure portion.

14. An animal litter container as defined in claim 1 wherein each of said enclosure portions is of a one-piece construction.

15. An animal litter container as defined in claim 14 wherein each of said enclosure portions is constructed of molded plastic.

* * * * *